US012617022B2

(12) United States Patent
Josefsson et al.

(10) Patent No.: US 12,617,022 B2
(45) Date of Patent: May 5, 2026

(54) METHOD OF PRODUCING A COATED CUTTING TOOL AND A COATED CUTTING TOOL

(71) Applicant: AB SANDVIK COROMANT, Sandviken (SE)

(72) Inventors: Fredrik Josefsson, Stockholm (SE); Lars Johnson, Stockholm (SE); Marta Saraiva, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 859 days.

(21) Appl. No.: 17/619,295

(22) PCT Filed: Jun. 17, 2020

(86) PCT No.: PCT/EP2020/066801
§ 371 (c)(1),
(2) Date: Dec. 15, 2021

(87) PCT Pub. No.: WO2020/254429
PCT Pub. Date: Dec. 24, 2020

(65) Prior Publication Data
US 2022/0297196 A1      Sep. 22, 2022

(30) Foreign Application Priority Data

Jun. 19, 2019    (EP) ..................................... 19181096

(51) Int. Cl.
*B23B 27/14*      (2006.01)
*B23C 5/16*       (2006.01)

(52) U.S. Cl.
CPC ................ *B23B 27/14* (2013.01); *B23C 5/16* (2013.01); *B23B 2222/16* (2013.01);
(Continued)

(58) Field of Classification Search
None
See application file for complete search history.

(56) References Cited

U.S. PATENT DOCUMENTS

2009/0226273 A1 *  9/2009  Johansson ........... C23C 14/0641
                                                      409/132
2011/0111197 A1 *  5/2011  Johansson ............. C04B 41/009
                                                      428/220
(Continued)

FOREIGN PATENT DOCUMENTS

EP          1452621 A2     9/2004
EP          2247772 A1     11/2010
(Continued)

OTHER PUBLICATIONS

Han, Fenglin. "Handbook of Powder Metallurgy vol. 2", Mettalurgical Industry Press, Jun. 30, 2012, p. 1144.
(Continued)

*Primary Examiner* — Seth Dumbris
(74) *Attorney, Agent, or Firm* — Corinne R. Gorski

(57) ABSTRACT

A method for producing a coated cutting tool for metal machining having a substrate and coating is provided. The coating includes at least one layer of (Ti,Al)N having a cubic crystal phase. The method includes the deposition of a layer of $Ti_{1-x}Al_xN$, $0.70 \leq x \leq 0.98$, the $Ti_{1-x}Al_xN$ having cubic crystal phase. The layer of $Ti_{1-x}Al_xN$ is deposited by cathodic arc evaporation at a vacuum chamber pressure of from 7 to 15 Pa of $N_2$ gas, using a DC bias voltage of from −200 to −400 V and using an arc discharge current of from 75 to 250 A. A coated cutting tool for metal machining having a coating including a (Ti,Al)N multi-layer of alternating sub-layers of at least $Ti_{1-y}Al_yN$ and $Ti_{1-z}Al_zN$, $0.35 \leq y \leq 0.65$ and $0.80 \leq z \leq 0.98$, with only cubic phase present is also provided.

7 Claims, 7 Drawing Sheets

101

100

(52) U.S. Cl.
      CPC ....... *B23B 2222/84* (2013.01); *B23B 2224/24*
            (2013.01); *B23B 2226/125* (2013.01); *B23B*
            *2226/18* (2013.01); *B23C 2222/16* (2013.01);
            *B23C 2222/84* (2013.01); *B23C 2224/24*
            (2013.01); *B23C 2226/125* (2013.01); *B23C*
            *2226/18* (2013.01)

(56)                     References Cited

U.S. PATENT DOCUMENTS

| | | | |
|---|---|---|---|
| 2013/0202896 A1* | 8/2013 | Pettersson ............... | C23C 28/42 |
| | | | 428/448 |
| 2018/0133805 A1* | 5/2018 | Paseuth ................. | C23C 28/042 |
| 2019/0071792 A1 | 3/2019 | Paseuth et al. | |

FOREIGN PATENT DOCUMENTS

| | | | |
|---|---|---|---|
| EP | 2835445 | A1 | 2/2015 |
| EP | 3441168 | A1 | 2/2019 |
| JP | 2018051705 | A | 4/2018 |
| JP | 2018161736 | A | 10/2018 |
| WO | 2009105024 | A1 | 8/2009 |
| WO | 2019043167 | A1 | 3/2019 |
| WO | 2019048507 | A1 | 3/2019 |

OTHER PUBLICATIONS

Zhou, Shuzhu. "Hard Materials and Tools". Metallurgical Industry
Press, Aug. 31, 2015, p. 71.

* cited by examiner

← 101

← 100

METHOD OF PRODUCING A COATED CUTTING TOOL AND A COATED CUTTING TOOL

RELATED APPLICATION DATA

This application is a § 371 National Stage Application of PCT International Application No. PCT/EP2020/066801 filed Jun. 17, 2020 claiming priority to EP 19181096.9 filed Jun. 19, 2019.

The present invention relates to a method of producing a coated cutting tool comprising a layer of (Ti,Al)N comprising cubic crystal structure and having a high aluminium content. The invention further relates to a coated cutting tool.

INTRODUCTION (Ti,Al)N coatings made by physical vapour deposition (PVD) are commonly used in the area of cutting tools for metal machining.

The crystal structure of (Ti,Al)N in PVD coatings can be cubic (NaCl (=B1)) structure or hexagonal (wurtzite) structure. In prior art studies generally a lower Al content, such as <60% of Al+Ti, in (Ti,Al)N gives a cubic structure and a high Al content, such as >70%, gives a hexagonal structure. The specific limit of the level of Al content for giving either a single phase cubic structure or a mixed structure comprising both cubic and hexagonal structure have been reported and vary to some extent depending on, for example, the deposition conditions.

A layer of single phase cubic (Ti,Al)N is known to possess good properties in terms of hardness and elastic modulus. These properties are beneficial to have for a coating of a cutting tool.

For example, Tanaka et al., "Properties of (Ti1-xAlx)N coatings for cutting tools prepared by the cathodic arc ion plating method", Journal of Vacuum Science & Technology A 10, 1749 (1992), reports (Ti1-xAlx)N films being single phase with a cubic B1 structure up to x=0.6 while a further increase in the aluminium content gave a wurtzite structure for x=0.85. Furthermore, Kimura et al., "Effects of Al content on hardness, lattice parameter and microstructure of (Ti1-xAlx)N films", Surface and Coatings Technology 120-121 (1999) 438-441, reports (Ti1-xAlx)N films synthesized by the arc ion plating method where the NaCl structure for x≤0.6 changed into wurtzite structure for x≥0.7.

WO2019/048507A1 discloses a method for producing a (Ti,Al)N film with high aluminium content by using High Power Pulse Magnetron Sputtering (HIPIMS) techniques, the film exhibiting a crystallographic cubic phase.

When depositing (Ti,Al)N films by cathodic arc evaporation a bias voltage is applied and the reaction chamber has a certain level of nitrogen gas pressure. A usual level of bias voltage is from −30 to −150 V. The higher the voltage the higher energy in the plasma.

A usual level of nitrogen gas pressure is from 2 to 6 Pa. The higher the pressure of nitrogen gas the higher the number of nitrogen molecules per volume. The nitrogen molecules dampen the energy of the ions and particles in the plasma. This effect is therefore more pronounced the higher the nitrogen pressure. Thus, when using a high level of bias voltage the nitrogen gas pressure has traditionally been kept low in order not to counter-act with the desired effect of using high bias voltage.

It is an object of the present invention to provide a method for producing a (Ti,Al)N layer having a high aluminium content and still comprising a cubic crystal phase.

There is a continuing demand for coated cutting tools in which the coating has good resistance to various types of wear such as flank wear and crater wear in order to provide long tool life in metal machining applications. Also, certain applications has high demands on edge line integrity of the cutting tool, i.e., a high edge line toughness is desired.

Thus, it is a further object of the present invention to provide a coated cutting tool with good flank wear resistance and/or good crater wear resistance and/or good edge line toughness.

THE INVENTION

It has now been provided a method for producing a coated cutting tool for metal machining comprising a substrate and coating, the coating comprising at least one layer of (Ti,Al)N comprising cubic crystal phase and having a high aluminium content.

The presence of cubic crystal phase in a layer of (Ti,Al)N is herein defined as the presence of one or more cubic peaks in theta-2theta XRD analysis.

The method comprises deposition of a layer of $Ti_{1-x}Al_xN$, $0.70 \leq x \leq 0.98$, $Ti_{1-x}Al_xN$ comprises cubic crystal phase, the layer of $Ti_{1-x}Al_xN$ is deposited by cathodic arc evaporation at a vacuum chamber pressure of from 7 to 15 Pa, preferably from 8 to 12 Pa of $N_2$ gas, using a DC bias voltage of from −200 to −400 V, preferably from −250 to −350 V, and using an arc discharge current of from 75 to 250 A, preferably from 100 to 200 A.

A (Ti,Al)N layer made according to the present method can be deposited as a single-layer. The thickness of the $Ti_{1-x}Al_xN$ layer is then suitably from 0.2 to 10 μm, preferably from 0.5 to 5 μm.

In one embodiment, the present method provides a single-layer (Ti,Al)N which comprises a cubic crystal structure at aluminium contents (Al out of Al+Ti) of at least up to 80 at % or even up to 85 at %. The cubic (Ti,Al)N phase may be present to an extent of being the single phase in the (Ti,Al)N layer or the cubic (Ti,Al)N phase may be present together with a hexagonal (Ti,Al)N phase. Thus, in one embodiment of the present method the layer of $Ti_{1-x}Al_xN$ is a single-layer comprising a cubic crystal structure, $0.70 \leq x \leq 0.85$. In another embodiment of the present method the layer of $Ti_{1-x}Al_xN$ is a single-layer comprising a cubic crystal structure, $0.70 \leq x \leq 0.80$.

In another embodiment of the present method the layer of $Ti_{1-x}Al_xN$ is a single-layer comprising a cubic crystal structure, $0.75 \leq x \leq 0.85$. In another embodiment of the present method the layer of $Ti_{1-x}Al_xN$ is a single-layer comprising a cubic crystal structure, $0.75 \leq x \leq 0.80$.

For aluminium contents (Al out of Al+Ti) of higher than 75 at %, or higher than 80 at %, the cubic (Ti,Al)N phase is suitably present together with a hexagonal (Ti,Al)N phase when the (Ti,Al)N layer is a single-layer. For aluminium contents of equal to or lower than 75 at %, preferably lower than or equal to 80 at %, the cubic (Ti,Al)N phase is suitably the single (Ti,Al)N phase present.

A (Ti,Al)N layer made according to the present method can also be used as part of a multi-layer in a coating where the $Ti_{1-x}Al_xN$ sub-layer is present in a repeated manner with sub-layers of at least one further (Ti,Al)N. Embodiments of such a (Ti,Al)N multi-layer have alternating layers of at least two different sub-layers (A, B, C . . . ) which are repeated as, for example, A/B/C . . . /A/B/C . . . / . . . or A/B/ A/B/ . . . , the (Ti,Al)N sub-layers A, B, C . . . have different Ti/Al ratios between each other.

The average thickness of each (Ti,Al)N sub-layer is suitably from 1 to 20 nm, preferably from 1 to 10 nm, most preferably from 1.5 to 5 nm.

For a multi-layer (Ti,Al)N it is possible to obtain single phase cubic structure of a (Ti,Al)N sub-layer up to a higher Al content than for a single-layer (Ti,Al)N.

In one embodiment the (Ti,Al)N multi-layer is a multi-layer of alternating sub-layers of at least $Ti_{1-y}Al_yN$ and $Ti_{1-z}Al_zN$, $0.35 \leq y \leq 0.65$ and $0.80 \leq z \leq 0.98$, with only cubic phase present.

In one embodiment $0.35 \leq y \leq 0.65$ and $0.85 \leq z \leq 0.96$.

In one embodiment $0.40 \leq y \leq 0.60$ and $0.80 \leq z \leq 0.98$.

In one embodiment $0.40 \leq y \leq 0.60$ and $0.85 \leq z \leq 0.96$.

The substrate of the coated cutting tool can be selected from the group of cemented carbide, cermet, ceramic, cubic boron nitride and high speed steel. Preferably, the substrate of the coated cutting tool is cemented carbide.

It has now further been provided a coated cutting tool for metal machining comprising a substrate and a coating, the coating comprising a multi-layer of alternating sub-layers of cubic (Ti,Al)N.

The coated cutting tool comprises a multi-layer of alternating sub-layers of at least $Ti_{1-y}Al_yN$ and $Ti_{1-z}Al_zN$, $0.35 \leq y \leq 0.65$ and $0.80 \leq z \leq 0.98$, with only cubic phase present (as detected by XRD theta-2theta analysis), the average individual (Ti,Al)N sub-layer thicknesses are from 1 to 20 nm. The term "only cubic phase present" means that there are no hexagonal (Ti,Al)N peaks seen in theta-2theta XRD analysis but only one or more cubic (Ti,Al)N peaks.

The ratio of thickness of the sub-layer $Ti_{1-y}Al_yN$ to thickness of the sub-layer $Ti_{1-z}Al_zN$ is suitably 0.5 and <3, preferably from 0.75 to 2.

In one embodiment, the (Ti,Al)N multi-layer comprises alternating sub-layers of at least three different sub-layers (A, B, C . . . ) which are repeated as . . . A/B/C . . . /A/ B/C . . . / . . . , the composition of any sub-layer A, B, C . . . is $Ti_{1-v}Al_vN$, $0.35 \leq v \leq 0.98$, two sublayers are respectively $Ti_{1-w}Al_wN$ and $Ti_{1-r}Al_rN$, $0.35 \leq w \leq 0.65$ and $0.8 \leq r \leq 0.98$.

In one embodiment the (Ti,Al)N multi-layer is a multi-layer of alternating sub-layers of $Ti_{1-y}Al_yN$ and $Ti_{1-z}Al_zN$, $0.35 \leq y \leq 0.65$ and $0.80 \leq z \leq 0.98$.

In one embodiment $0.35 \leq y \leq 0.65$ and $0.85 \leq z \leq 0.96$.

In one embodiment $0.40 \leq y \leq 0.60$ and $0.80 \leq z \leq 0.98$.

In one embodiment $0.40 \leq y \leq 0.60$ and $0.85 \leq z \leq 0.96$.

The average individual sub-layer thicknesses are suitably from 1 to 10 nm, preferably from 1.5 to 5 nm.

In one embodiment the (Ti,Al)N is an aperiodic multi-layer. In this type of multilayer the sub-layers, even those of the same composition, may have some difference in thicknesses. This type of multilayer is usually resulting from a deposition process using rotating cutting tool blanks, for three-fold rotation, in the PVD chamber.

In one embodiment the (Ti,Al)N is a periodic multilayer. In this type of multilayer the sub-layers of each composition have about the same thickness.

The total thickness of the (Ti,Al)N multilayer is from 0.5 to 10 μm, or from 1 to 8 μm, or from 2 to 6 μm.

The (Ti,Al)N multilayer is suitably a cathodic arc evaporation deposited layer.

In one embodiment the coating comprises one or more further layers of a metal nitride(s) below the (Ti,Al)N multilayer. The metal nitride(s) are suitably a nitride/nitrides of one or more metals belonging to group 4 to 6 in the IUPAC periodic table of elements, optionally together with Al and/or Si. Examples of such metal nitride(s) are TiN and (Ti,Al)N. The total thickness of these one or more metal nitride(s) layers can be from about 0.1 to about 2 μm, or from about 0.2 to about 1 μm.

The substrate of the coated cutting tool can be selected from the group of cemented carbide, cermet, ceramic, cubic boron nitride and high speed steel. Preferably, the substrate of the coated cutting tool is cemented carbide.

The coated cutting tool can be a cutting tool insert, a drill, or a solid end-mill, for metal machining. The cutting tool insert is suitably a milling, drilling or turning insert.

The (Ti,Al)N layers herein may contain additional metals Me as part of the nitride, such as Cr, Zr, and Si, in small amounts, up to an atomic percent (Me out of Me+Al+Ti) of 3 at %, or even up to 5 at %, without substantially altering the properties of the coating. If Me is present then Me is to be counted as Ti in the (Ti,Al)N formulas used herein. Thus, the Ti content in the (Ti,Al)N is then in fact the Ti+Me content.

EXAMPLES

Example 1

Different coatings of $Ti_{0.20}Al_{0.80}N$ were deposited by cathodic arc evaporation on sintered cemented carbide cutting tool insert blanks SNMA120808-KR. The cemented carbide had a composition of 10 wt % Co and rest WC. The samples 1-4 were deposited in three-fold rotation using a rotating table with "trees" of pins on which blanks were mounted. The reaction chamber comprised four flanges for targets. $Ti_{0.20}Al_{0.80}$ targets were mounted on two opposing flanges with the two remaining flanges being empty. The chamber was pumped down to vacuum (less than $10^{-2}$ Pa) and heated to about 450° C. by heaters located inside the chamber. The blanks were etched for 60 minutes in an Ar plasma. The chamber pressure (reaction pressure) was set to 4 Pa, or set to 10 Pa, of $N_2$ gas and a desired DC bias voltage which for the samples 1-4 were −50 V, −225 V, −300 V and −375 V, respectively, see Table 1. The cathodes were run in an arc discharge mode at a current of 150 A (each). A 3 μm layer was deposited.

TABLE 1

| Sample | Bias voltage (V) | N2 pressure (Pa) |
| --- | --- | --- |
| 1 | −50 | 4 |
| 2 | −225 | 10 |
| 3 | −300 | 10 |
| 4 | −375 | 10 |

X-ray diffraction (XRD) analysis was conducted on the flank face of the coated inserts using a PANalytical CubiX3 diffractometer equipped with a PIXcel detector. The coated cutting tool inserts were mounted in sample holders that ensure that the flank face of the samples were parallel to the reference surface of the sample holder and also that the flank face was at appropriate height. Cu-$K_\alpha$ radiation was used for the measurements, with a voltage of 45 kV and a current of 40 mA. Anti-scatter slit of ½ degree and divergence slit of ¼ degree were used. The diffracted intensity from the coated cutting tool was measured around 20 angles where relevant peaks occur.

Figure 1:
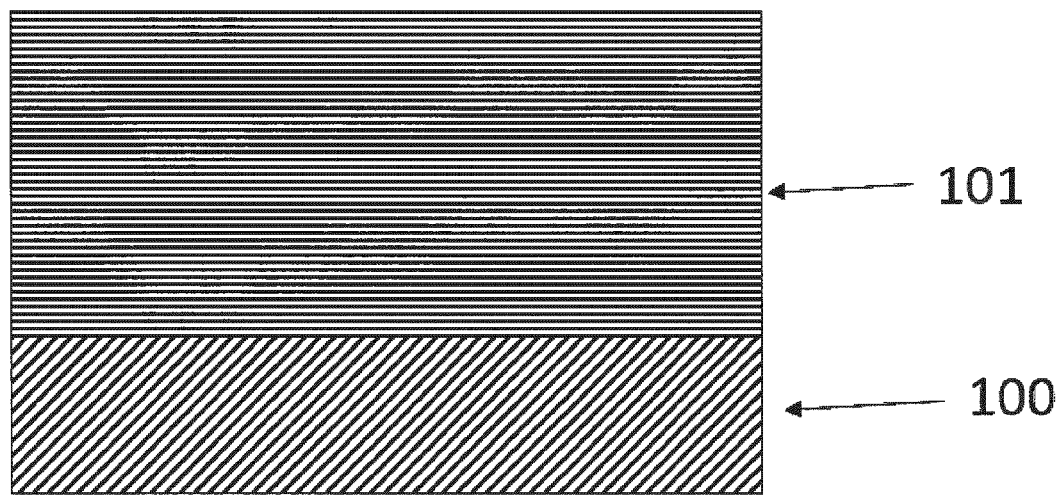
FIG. 1 shows a schematic illustration of a substrate (100) with a coating (101) according to the invention.
Figure 2:
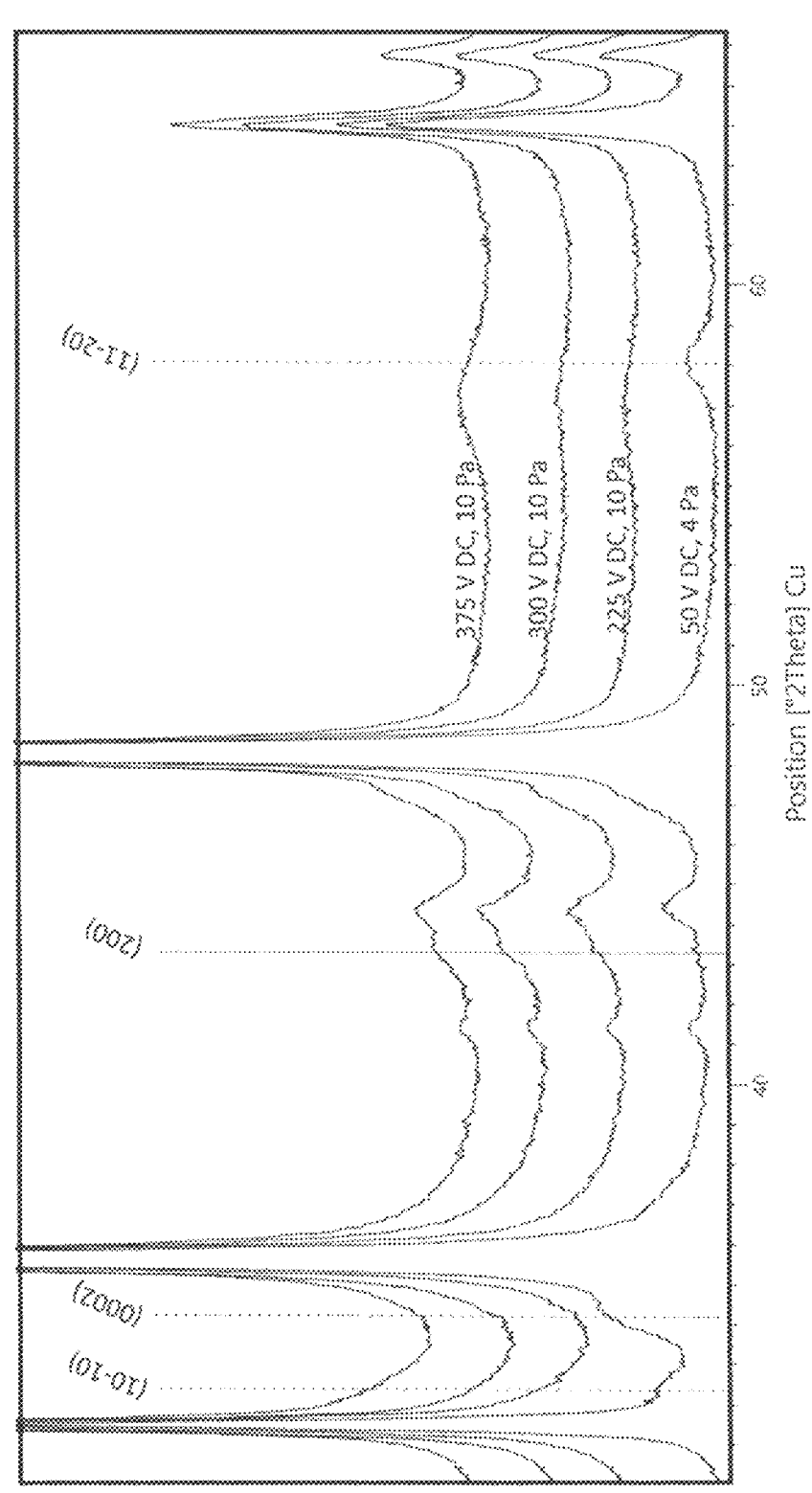
FIG. 2 shows X-ray diffractograms of samples from deposition of a (Ti,Al)N layers at different bias voltages and/or pressure.

FIG. 2 shows the diffractograms of the samples 1-4.

It is concluded that substantially no hexagonal signals are seen for the samples made using 10 Pa nitrogen pressure and substrate bias voltage of −300 V and −225 V. Sample 1 using conventional parameters showed no visible cubic signal in the diffractogram (for example a (2 0 0) reflection). Sample 4 showed a cubic (2 0 0) reflection but also a significant hexagonal (1 1-2 0) reflection.

Example 2

Different coatings of $Ti_{0.10-0.40}Al_{0.60-0.90}N$ were made by using three different targets, $Ti_{0.40}Al_{0.60}$, $Ti_{0.25}Al_{0.75}$ and $Ti_{0.10}Al_{0.90}$, positioned as a set of three targets at different heights on all four flanges in the reaction chamber. Thereby the composition of the coatings differed in a gradual manner depending on the position of the blanks in the chamber.

A first set of samples were made by depositing a (Ti,Al)N layer on cutting tool insert cemented carbide blanks of the geometry SNMA120808-KR of the same composition as in Example 1 and by using the deposition procedure as described in Example 1 using a DC bias voltage of −50 V and a nitrogen pressure of 4 Pa. The blanks were first etched for 60 minutes in an Ar plasma. The thickness of the coating was about 3 μm.

A second set of samples were made by depositing a (Ti,Al)N layer on cutting tool insert cemented carbide blanks using the deposition procedure as described in Example 1 using a DC bias voltage of −300 V and a nitrogen pressure of 10 Pa. The blanks were first etched for 60 minutes in an Ar plasma. The thickness of the coating was about 3 μm.

Samples from 14 different levels in the reaction chamber were analysed by XRD. The Al content (out of Ti+Al) in the coatings were also analysed by EDS. See Table 2 showing samples 5-18 from depositions at DC bias voltage of −50 V and a nitrogen pressure of 4 Pa and Table 3 showing samples 19-32 from depositions at DC bias voltage of −300 V and a nitrogen pressure of 10 Pa. Not all samples were analysed for the second set of samples (see Table 3) but the gradual increase in Al content for the different samples is apparent.

TABLE 2

| Sample $Ti_{1-x}Al_xN$ | | x |
| --- | --- | --- |
| 5 | $Ti_{1-x}Al_xN$ | 0.61 |
| 6 | $Ti_{1-x}Al_xN$ | 0.63 |
| 7 | $Ti_{1-x}Al_xN$ | 0.64 |
| 8 | $Ti_{1-x}Al_xN$ | 0.66 |
| 9 | $Ti_{1-x}Al_xN$ | 0.67 |
| 10 | $Ti_{1-x}Al_xN$ | 0.69 |
| 11 | $Ti_{1-x}Al_xN$ | 0.70 |
| 12 | $Ti_{1-x}Al_xN$ | 0.76 |
| 13 | $Ti_{1-x}Al_xN$ | 0.78 |
| 14 | $Ti_{1-x}Al_xN$ | 0.83 |
| 15 | $Ti_{1-x}Al_xN$ | 0.82 |
| 16 | $Ti_{1-x}Al_xN$ | 0.84 |
| 17 | $Ti_{1-x}Al_xN$ | 0.86 |
| 18 | $Ti_{1-x}Al_xN$ | 0.85 |

TABLE 3

| Sample | | x |
| --- | --- | --- |
| 19 | $Ti_{1-x}Al_xN$ | 0.60 |
| 20 | $Ti_{1-x}Al_xN$ | —* |
| 21 | $Ti_{1-x}Al_xN$ | 0.63 |
| 22 | $Ti_{1-x}Al_xN$ | —* |
| 23 | $Ti_{1-x}Al_xN$ | 0.67 |
| 24 | $Ti_{1-x}Al_xN$ | —* |
| 25 | $Ti_{1-x}Al_xN$ | 0.72 |
| 26 | $Ti_{1-x}Al_xN$ | 0.74 |
| 27 | $Ti_{1-x}Al_xN$ | —* |
| 28 | $Ti_{1-x}Al_xN$ | 0.78 |
| 29 | $Ti_{1-x}Al_xN$ | —* |
| 30 | $Ti_{1-x}Al_xN$ | 0.81 |
| 31 | $Ti_{1-x}Al_xN$ | —* |
| 32 | $Ti_{1-x}Al_xN$ | 0.87 |

*not analysed

Figure 3:
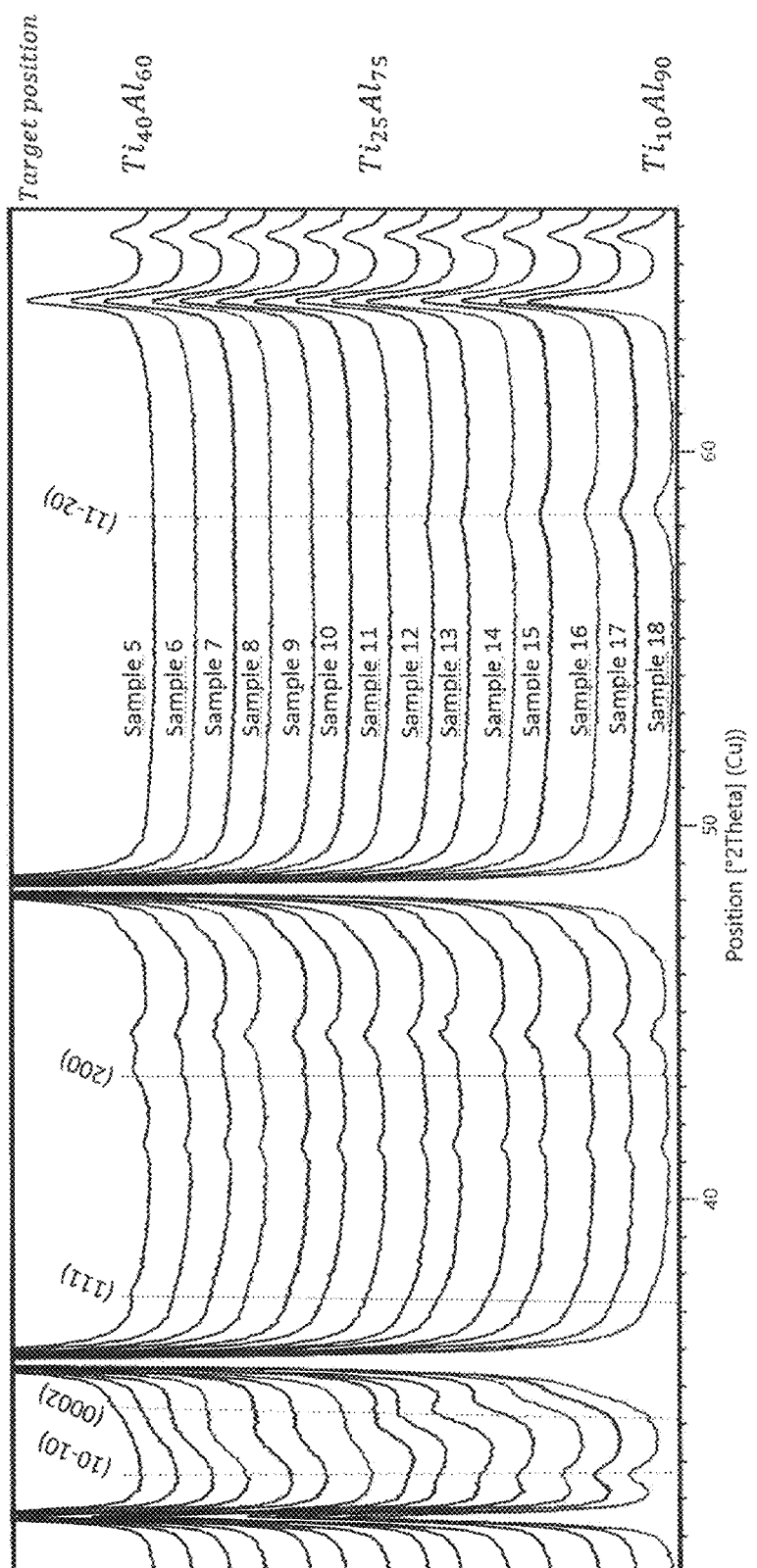
FIG. 3 shows X-ray diffractograms of (Ti,Al)N single-layers with different Al contents deposited with a conventional method.

FIG. 3 shows X-ray diffractograms of (Ti,Al)N the single-layers of samples 5-18 with different Al contents deposited with a conventional method.

Figure 4:
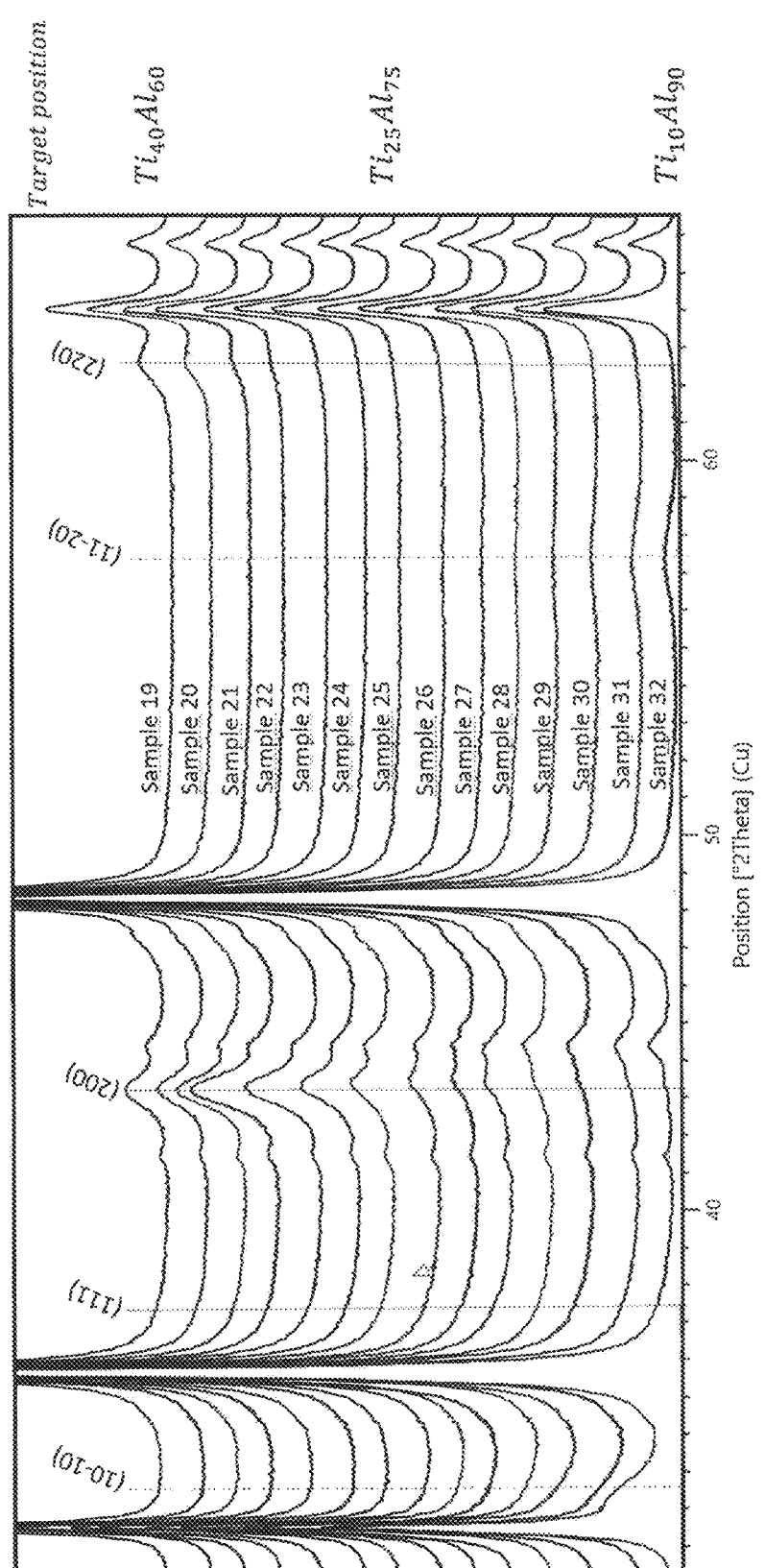
FIG. 4 shows X-ray diffractograms of (Ti,Al)N single-layers with different Al contents deposited with the method of the invention.

FIG. 4 shows X-ray diffractograms of (Ti,Al)N single-layers of samples 19-32 with different Al contents deposited with the method of the invention.

From FIG. 3 (coatings deposited using the conventional method) it is seen that the cubic (2 0 0) reflection is noticed up to a Al content (out of Ti+Al) of about 66 at. % and a clearly visible hexagonal reflection (0 0 0 2) is seen starting already at an Al content of about 63 at. % and visible hexagonal reflections (1 1-2 0) and (1 0-1 0) are seen starting at an Al content of about 76 at. %.

From FIG. 4 (coatings deposited using the method according to the invention) it is seen that the cubic (2 0 0) reflection is noticed up to a Al content (out of Ti+Al) of about 80 at. % and clearly visible hexagonal reflections (1 1-2 0) and (1 0-1 0) are seen only for Al contents starting at about 81 at. %.

It is concluded that the method according to the invention provides for cubic structure up to much higher Al contents than the conventional method.

Example 3

Different multi-layer coatings of $Ti_{0.10-0.40}Al_{0.60-0.90}N/Ti_{0.50}Al_{0.50}N$ were made by using three different targets, $Ti_{0.40}Al_{0.60}$, $Ti_{0.25}Al_{0.75}$ and $Ti_{0.10}Al_{0.90}$, positioned as a set of three targets at different heights on two opposing flanges in the reaction chamber and $Ti_{0.50}Al_{0.50}$ targets positioned on the two remaining opposing flanges. Thereby the composition of one of the sub-layers in the multi-layered coating differed in a gradual manner depending on the position of the blanks in the chamber.

A first set of samples were made by depositing a multi-layer on cutting tool insert cemented carbide blanks of the geometry SNMA120808-KR of the same composition as in Example 1 and by using the deposition procedure as described in Example 1 using a DC bias voltage of −50 V and a nitrogen pressure of 4 Pa. The blanks were etched for 60 minutes in an Ar plasma. A start layer of about 0.3 μm $Ti_{0.50}Al_{0.50}N$ was first deposited on the cemented carbide substrate using DC bias voltage of −50 V and a nitrogen pressure of 4 Pa. The thickness of the coating was about 3 μm. An aperiodic multi-layer was provided. The average sub-layer thickness for the two different types of sub-layers was each about 2 nm.

A second set of samples were made by depositing a multi-layer on cutting tool insert cemented carbide blanks using the deposition procedure as described in Example 1 using a DC bias voltage of −300 V and a nitrogen pressure of 10 Pa. The blanks were etched for 60 minutes in an Ar plasma. A start layer of about 0.3 μm $Ti_{0.50}Al_{0.50}N$ was first deposited on the cemented carbide substrate using DC bias voltage of −50 V and a nitrogen pressure of 4 Pa. The thickness of the coating was about 3 μm. An aperiodic multi-layer was provided. The average sub-layer thickness for the two different types of sub-layers was each about 1.5 nm.

Samples from 17 different levels in the reaction chamber were analysed by XRD. The Al content (out of Ti+Al) in the coatings were also analysed by EDS. From each EDS result the sub-layer composition for the sub-layer $Ti_{1-x}Al_xN$ other than $Ti_{0.50}Al_{0.50}N$ was estimated from target composition and assuming equal sub-layer thicknesses of $Ti_{1-x}Al_xN$ and $Ti_{0.50}Al_{0.50}N$.

See Table 4 showing samples 33-49 from depositions at DC bias voltage of −50 V and a nitrogen pressure of 4 Pa and Table 5 showing samples 50-66 from depositions at DC bias voltage of −300 V and a nitrogen pressure of 10 Pa. As seen in the tables not all samples were analysed but the gradual increase in Al content for the different samples is apparent.

TABLE 4

| Sample $Ti_{0.50}Al_{0.50}N/$ $Ti_{1-x}Al_xN$ | | Al content from EDS in whole (Ti, Al)N multilayer | x |
|---|---|---|---|
| 33 | $Ti_{1-x}Al_xN$ | 0.543 | 0.59 |
| 34 | $Ti_{1-x}Al_xN$ | 0.547 | 0.59 |
| 35 | $Ti_{1-x}Al_xN$ | 0.555 | 0.61 |
| 36 | $Ti_{1-x}Al_xN$ | 0.564 | 0.63 |
| 37 | $Ti_{1-x}Al_xN$ | 0.575 | 0.65 |
| 38 | $Ti_{1-x}Al_xN$ | 0.572 | 0.64 |
| 39 | $Ti_{1-x}Al_xN$ | 0.588 | 0.68 |
| 40 | $Ti_{1-x}Al_xN$ | —* | —* |
| 41 | $Ti_{1-x}Al_xN$ | 0.598 | 0.70 |
| 42 | $Ti_{1-x}Al_xN$ | —* | —* |
| 43 | $Ti_{1-x}Al_xN$ | 0.635 | 0.77 |
| 44 | $Ti_{1-x}Al_xN$ | 0.642 | 0.78 |
| 45 | $Ti_{1-x}Al_xN$ | 0.658 | 0.82 |
| 46 | $Ti_{1-x}Al_xN$ | 0.666 | 0.83 |
| 47 | $Ti_{1-x}Al_xN$ | 0.673 | 0.85 |
| 48 | $Ti_{1-x}Al_xN$ | 0.683 | 0.87 |
| 49 | $Ti_{1-x}Al_xN$ | 0.686 | 0.87 |

*not analysed

TABLE 5

| Sample $Ti_{0.50}Al_{0.50}N/$ $Ti_{1-x}Al_xN$ | | Al content from EDS in whole (Ti, Al)N multilayer | x |
|---|---|---|---|
| 50 | $Ti_{1-x}Al_xN$ | 0.506 | 0.51 |
| 51 | $Ti_{1-x}Al_xN$ | —* | —* |
| 52 | $Ti_{1-x}Al_xN$ | 0.516 | 0.53 |
| 53 | $Ti_{1-x}Al_xN$ | —* | —* |
| 54 | $Ti_{1-x}Al_xN$ | 0.552 | 0.60 |
| 55 | $Ti_{1-x}Al_xN$ | —* | —* |
| 56 | $Ti_{1-x}Al_xN$ | 0.588 | 0.68 |
| 57 | $Ti_{1-x}Al_xN$ | —* | —* |
| 58 | $Ti_{1-x}Al_xN$ | 0.615 | 0.73 |
| 59 | $Ti_{1-x}Al_xN$ | —* | —* |
| 60 | $Ti_{1-x}Al_xN$ | 0.614 | 0.73 |
| 61 | $Ti_{1-x}Al_xN$ | —* | —* |
| 62 | $Ti_{1-x}Al_xN$ | 0.648 | 0.80 |
| 63 | $Ti_{1-x}Al_xN$ | —* | —* |
| 64 | $Ti_{1-x}Al_xN$ | 0.672 | 0.84 |
| 65 | $Ti_{1-x}Al_xN$ | —* | —* |
| 66 | $Ti_{1-x}Al_xN$ | 0.683 | 0.87 |

*not analysed

Figure 5:
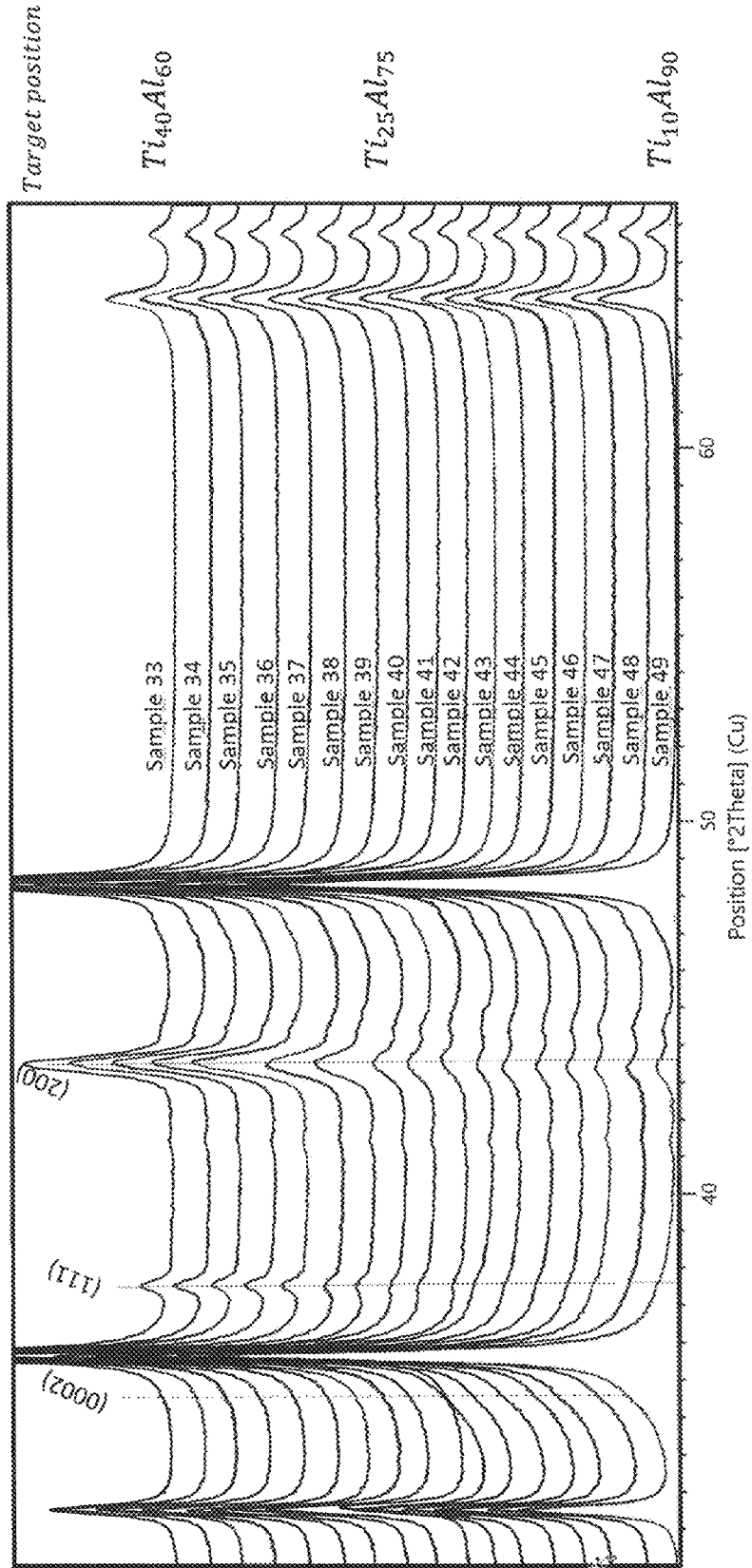
FIG. 5 shows X-ray diffractograms of (Ti,Al)N multi-layers with different Al contents deposited with a conventional method.

FIG. 5 shows X-ray diffractograms of samples 33-49 of the whole (Ti,Al)N multi-layers with all sub-layers deposited with a conventional method.

Figure 6:
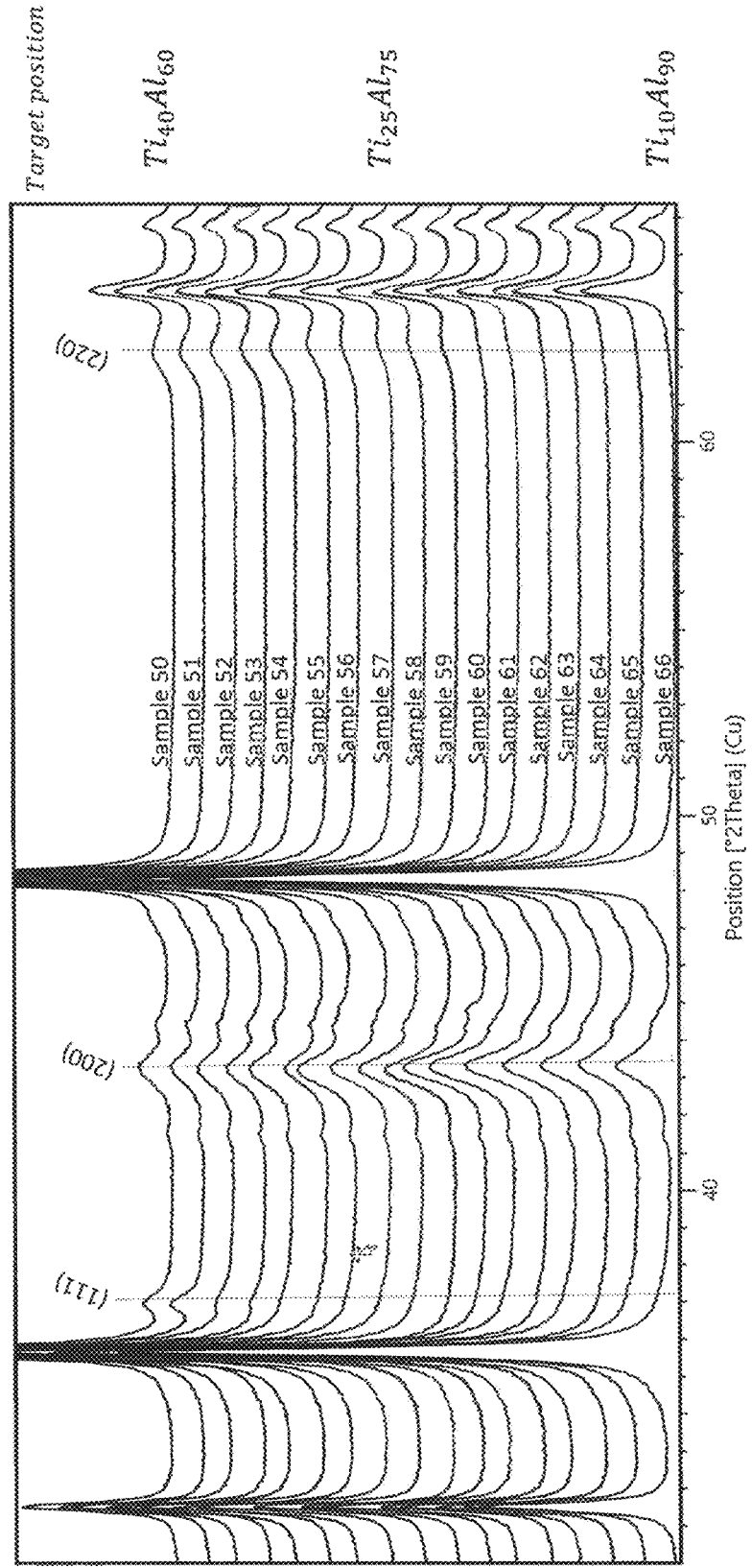
FIG. 6 shows X-ray diffractograms of (Ti,Al)N multi-layers with different Al contents deposited with the method of the invention.

FIG. 6 shows X-ray diffractograms of samples 50-66 of the whole (Ti,Al)N multi-layers with all sub-layers deposited with the method of the invention.

From FIG. 5 (multi-layer coatings deposited using the conventional method) it is seen that clearly visible hexagonal reflection (0 0 0 2) is seen starting at an Al content (out of Ti+Al) in one of the sub-layers being about 77 at. %.

From FIG. 6 (multi-layer coatings deposited using the method according to the invention) no hexagonal reflection is seen at all even at an Al content (out of Ti+Al) in one of the sub-layers being about 87 at. %.

It is concluded that the method according to the invention provides for a single phase cubic structure up to much higher Al contents than the conventional method. Also, a single phase cubic structure is provided in a multi-layer according to the invention having an Al content (out of Ti+Al) in one sub-layer of at least 87 at. %.

Example 4

Further samples of a multi-layer coating of $Ti_{0.10}Al_{0.90}N/$ $Ti_{0.50}Al_{0.50}N$ and $Ti_{0.05}Al_{0.95}N/Ti_{0.50}Al_{0.50}N$ were made by using $Ti_{0.10}Al_{0.90}$ targets (resp. $Ti_{0.05}Al_{0.95}$ targets) positioned on two opposing flanges in the reaction chamber and $Ti_{0.50}Al_{0.50}$ targets positioned on the two remaining opposing flanges.

A set of samples ("Sample 67 and 68") were made by depositing a multi-layer of alternating sub-layers of $Ti_{0.10}Al_{0.90}N/Ti_{0.50}Al_{0.50}N$ and $Ti_{0.05}Al_{0.95}N/Ti_{0.50}Al_{0.50}N$, respectively, on cutting tool insert cemented carbide blanks of the turning insert geometry CNMG120804-MM (Sample 67a and 68a) and the milling insert geometry R390-11T308M-PM (Sample 67b and 68b). The cemented carbide being of the same composition as in Example 1 and by using the deposition procedure as described in Example 1 using a DC bias voltage of −50 V and a nitrogen pressure of 4 Pa. The blanks were etched for 60 minutes in an Ar plasma. A start layer of about 0.3 μm $Ti_{0.50}Al_{0.50}N$ was first deposited on the cemented carbide substrate using DC bias voltage of −50 V and a nitrogen pressure of 4 Pa. The thickness of the coating was about 3 μm. An aperiodic multi-layer was provided. The average sub-layer thickness for the two different types of sub-layers in the respective sample was each about 2 nm.

A set of samples ("Sample 69 and 70") were then made by depositing a multi-layer of alternating sub-layers of $Ti_{0.10}Al_{0.90}N/Ti_{0.50}Al_{0.50}N$ and $Ti_{0.05}Al_{0.95}N/Ti_{0.50}Al_{0.50}N$, respectively, on cutting tool insert cemented carbide blanks of the turning insert geometry CNMG120804-MM (Sample 69a and 70a) and the milling insert geometry R390-11T308M-PM (Sample 69b and 70b). The cemented carbide being of the same composition as in Example 1 and by using the deposition procedure as described in Example 1 using a DC bias voltage of −300 V and a nitrogen pressure of 10 Pa. The blanks were etched for 60 minutes in an Ar plasma. A start layer of about 0.3 μm $Ti_{0.50}Al_{0.50}N$ was first deposited on the cemented carbide substrate using DC bias voltage of −50 V and a nitrogen pressure of 4 Pa. The thickness of the coating was about 3 μm. An aperiodic multi-layer was provided. The average sub-layer thickness for the two different types of sub-layers in the respective sample was each about 1.5 nm. There was no analysis made on the actual composition of multi-layers but the composition of the multi-layers were estimated to be very similar to the target composition, i.e., $Ti_{0.10}Al_{0.90}N/Ti_{0.50}Al_{0.50}N$ and $Ti_{0.05}Al_{0.95}N/Ti_{0.50}Al_{0.50}N$. A few percentage difference may be present.

Figure 7:
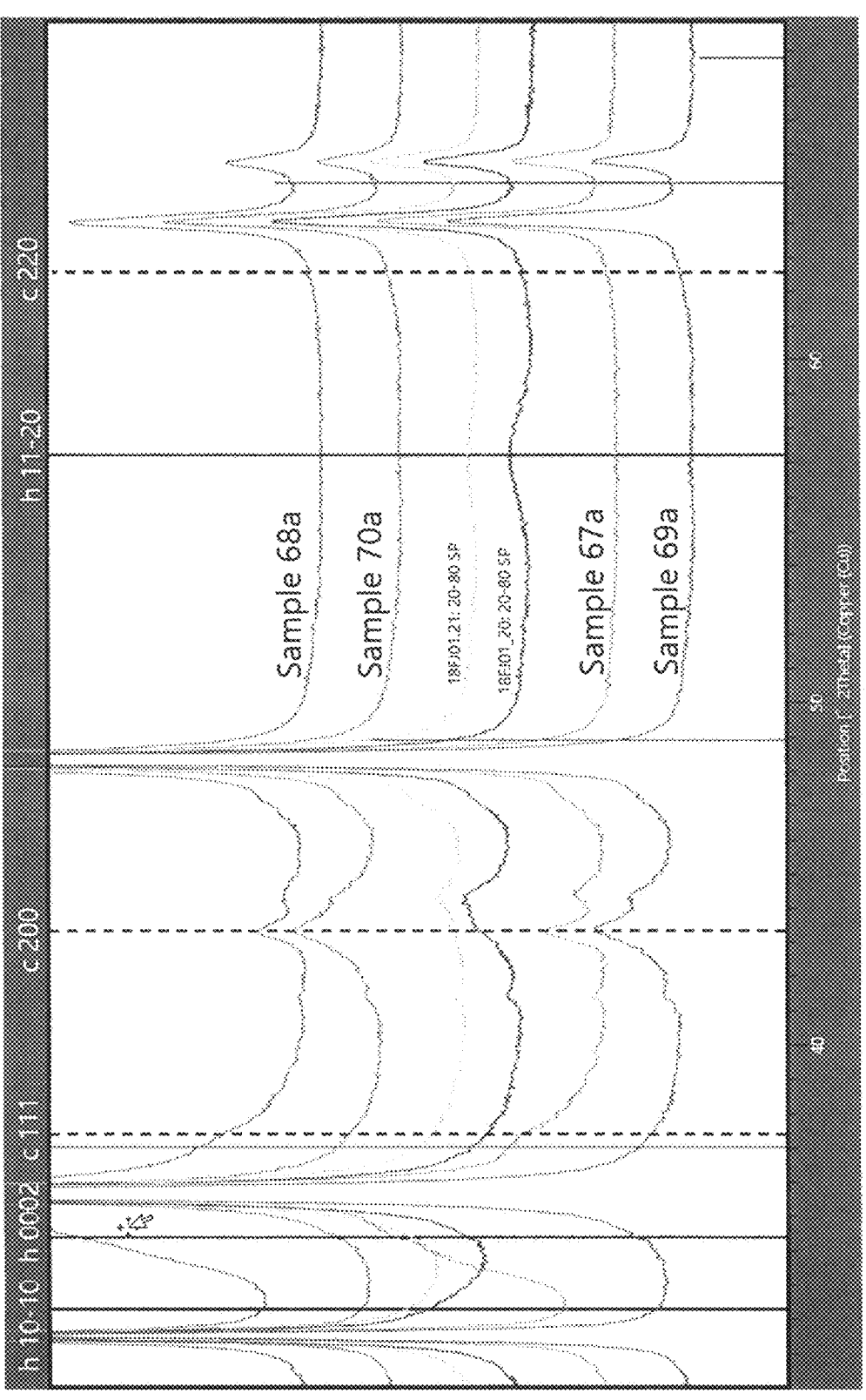
FIG. 7 shows X-ray diffractograms of $Ti_{0.10}Al_{0.90}N/Ti_{0.50}Al_{0.50}N$ and $Ti_{0.05}Al_{0.95}N/Ti_{0.50}Al_{0.50}N$ multi-layers.

FIG. 7 shows X-ray diffractograms of the whole $Ti_{0.10}Al_{0.90}N/Ti_{0.50}Al_{0.50}N$ and $Ti_{0.05}Al_{0.95}N/Ti_{0.50}Al_{0.50}N$ multi-layers of Sample 67a and 68a made with a conventional method and Sample 69a and 70a made with the method according to the invention.

From FIG. 7 it is concluded that a sample having a multi-layer coating deposited using the conventional method has a clearly visible hexagonal (0 0 0 2) reflection in the diffractogram. The sample having a multi-layer coating deposited using the method according to the invention shows no hexagonal reflections.

It is concluded that the method according to the invention provides for a single phase cubic structure up to much higher Al contents than the conventional method. Also, a single phase cubic structure is provided in a multi-layer according to the invention having an Al content (out of Ti+Al) in one sub-layer of at least about 95 at. %.

Explanations to Terms Used in Examples 5-7

The following expressions/terms are commonly used in metal cutting, but nevertheless explained in the table below:
$V_c$ (m/min): cutting speed in meters per minute
$f_n$ (mm/rev) feed rate per revolution (in turning)
$a_p$ (mm): axial depth of cut in millimeter

Example 5

Flank Wear Test:
Longitudinal Turning
  Work piece material: Uddeholm Sverker 21 (tool steel),
    Hardness ~210HB, D=180, $L=700$ mm,
$V_c=125$ m/min
$f_n=0.072$ mm/rev
$a_p=2$ mm
without cutting fluid
The cut-off criteria for tool life is a flank wear VB of 0.15 mm.

The coating of Sample 67a, $Ti_{0.10}Al_{0.90}N/Ti_{0.50}Al_{0.50}N$ made by the conventional method, containing hexagonal phase was compared with the coating of Sample 69a, $Ti_{0.10}Al_{0.50}N/Ti_{0.50}Al_{0.50}N$ made by the method according to the invention and being of single phase cubic structure.

Example 6

Crater Wear Test:
Longitudinal Turning
  Work piece material: Ovako 825B, ball bearing steel. Hot
    rolled and annealed,
  Hardness ~200HB, D=160, L=700 mm,
  $V_c=160$ m/min
  $f_n=0.3$ mm/rev
  $a_p=2$ mm
  with cutting fluid
  The criteria for end of tool life is a crater area of 0.8 mm².

The coating of Sample 67a, $Ti_{0.10}Al_{0.50}N/Ti_{0.50}Al_{0.50}N$ made by the conventional method, containing hexagonal phase was compared with the coating of Sample 69a, $Ti_{0.10}Al_{0.50}N/Ti_{0.50}Al_{0.50}N$ made by the method according to the invention and being of single phase cubic structure.

Example 7

Thermal Crack Resistance ("Comb Crack" Resistance) Test:
Milling
  Work piece material: Toolox33, PK158 600×200×100
    mm, P2.5.Z.HT
  z=1
  $V_c=250$ m/min
  $f_z=0.20$ mm
  $a_e=12.5$ mm
  $a_p=3.0$
  with cutting fluid
  The cut off criteria is reached when the cracks have resulted in chipping of the edge >0.30 mm. Tool life is presented as the number of cut entrances in order to achieve these criteria.

The coating of Sample 67b, $Ti_{0.10}Al_{0.50}N/Ti_{0.50}Al_{0.50}N$ made by the conventional method, containing hexagonal phase was compared with the coating of Sample 69b, $Ti_{0.10}Al_{0.50}N/Ti_{0.50}Al_{0.50}N$ made by the method according to the invention and being of single phase cubic structure.

The results from the testings in Examples 5-7 are seen in Table 6.

TABLE 6

| Sample No. | Coating (estimated from target composition) | Comment | Flank wear Tool life (min) | Crater wear Tool life (min) | Comb cracks Tool life (min) |
|---|---|---|---|---|---|
| 67 | $Ti_{0.10}Al_{0.90}N/$ $Ti_{0.50}Al_{0.50}N$ | comparative | 5.5 | 3.6 | 30 |
| 69 | $Ti_{0.10}Al_{0.90}N/$ $Ti_{0.50}Al_{0.50}N$ | invention | 8.0 | 4.6 | 40 |

It is concluded that the sample according to the invention has better resistance to flank wear, crater wear and comb cracks than the comparative sample.

The invention claimed is:

1. A coated cutting tool for metal machining having a coating comprising a (Ti,Al) N multi-layer of alternating sub-layers of at least $Ti_{1-y}Al_yN$ and $Ti_{1-z}Al_zN$, $0.35 \leq y \leq 0.65$ and $0.80 \leq z \leq 0.98$, with only cubic phase present in the form of a single phase cubic structure, an average individual (Ti,Al) N sub-layer thicknesses being from 1 to 20 nm, the (Ti,Al) N multi-layer is an aperiodic multi-layer, wherein the (Ti,Al) N multi-layer is a cathodic arc evaporation deposited multi-layer.

2. The coated cutting tool according to claim 1, wherein $0.40 \leq y \leq 0.6$ and $0.85 \leq z \leq 0.96$.

3. The coated cutting tool according to claim 1, wherein the average individual sub-layer thicknesses are from 1.5 to 5 nm.

4. The coated cutting tool according to claim 1, wherein the total thickness of the (Ti,Al) N multilayer is from 0.5 to 10 μm.

5. The coated cutting tool according to claim 1, wherein a substrate of the coated cutting tool is selected from the group of cemented carbide, cermet, ceramic, cubic boron nitride and high speed steel.

6. The coated cutting tool according to claim 1, wherein the coated cutting tool is a cutting tool insert, a drill, or a solid end-mill, for metal machining.

7. The coated cutting tool according to claim 1, wherein a ratio of thickness of the sub-layer Ti1-yAlyN to a thickness of the sub-layer Ti1-zAlzN is $\geq 0.5$ and $< 3$.

\* \* \* \* \*